E. E. ROSE.
PERCOLATOR.
APPLICATION FILED DEC. 5, 1910.

1,155,166.

Patented Sept. 28, 1915.
2 SHEETS—SHEET 2.

WITNESSES:
C. L. Belcher
D. H. Mace

INVENTOR
Edward E. Rose
BY
Hiley Sloan
ATTORNEY

UNITED STATES PATENT OFFICE.

EDWARD E. ROSE, OF PITTSBURGH, PENNSYLVANIA, ASSIGNOR TO WESTINGHOUSE ELECTRIC AND MANUFACTURING COMPANY, A CORPORATION OF PENNSYLVANIA.

PERCOLATOR.

1,155,166.  Specification of Letters Patent.  Patented Sept. 28, 1915.

Application filed December 5, 1910. Serial No. 595,619.

*To all whom it may concern:*

Be it known that I, EDWARD E. ROSE, a citizen of the United States, and a resident of Pittsburgh, in the county of Allegheny and State of Pennsylvania, have invented a new and useful Improvement in Percolators, of which the following is a specification.

My invention relates to electrically heated liquid-containing vessels of the percolator type and it has special reference to removable heating devices therefor.

The object of my invention is to provide a device of the above-indicated class which shall be simple and economical in construction, efficient and effective in operation, and so fashioned as to be conveniently removable. Furthermore, my heating device is adapted to be employed in connection with the usual type of alcohol heated percolator without changing any of its structural features. Thus, if desired, it is possible to readily equip such a percolator for electric heating merely by associating my heater unit with the operating parts usually provided and by interposing a removable spacing ring, through which the heater leads are brought out, between the liquid-containing vessel and the upper receiving compartment.

In the prior art, when percolating machines have been electrically heated, it has been common practice to permanently secure the heater unit directly beneath the bottom of the vessel and thus heat the liquid contained therein by exterior means. This method, however, is very uneconomical and inefficient because a large portion of the energy is lost in radiated heat which performs no useful function.

In a percolating machine, two primary operations are necessary,—first, to gradually raise the temperature of the main body of liquid and, second, to rapidly raise the small body of liquid directly under the fountain tube to a very high temperature, in order that the percolating operation may be started as quickly as possible.

According to my invention, I provide a heating device which is adapted to be immersed in liquid and which is so designed that a portion of the heat is stored in the main body of the liquid, while the greater part is localized and imparted to a small segregated portion of the liquid for the purpose hereinbefore mentioned.

Figure 1:
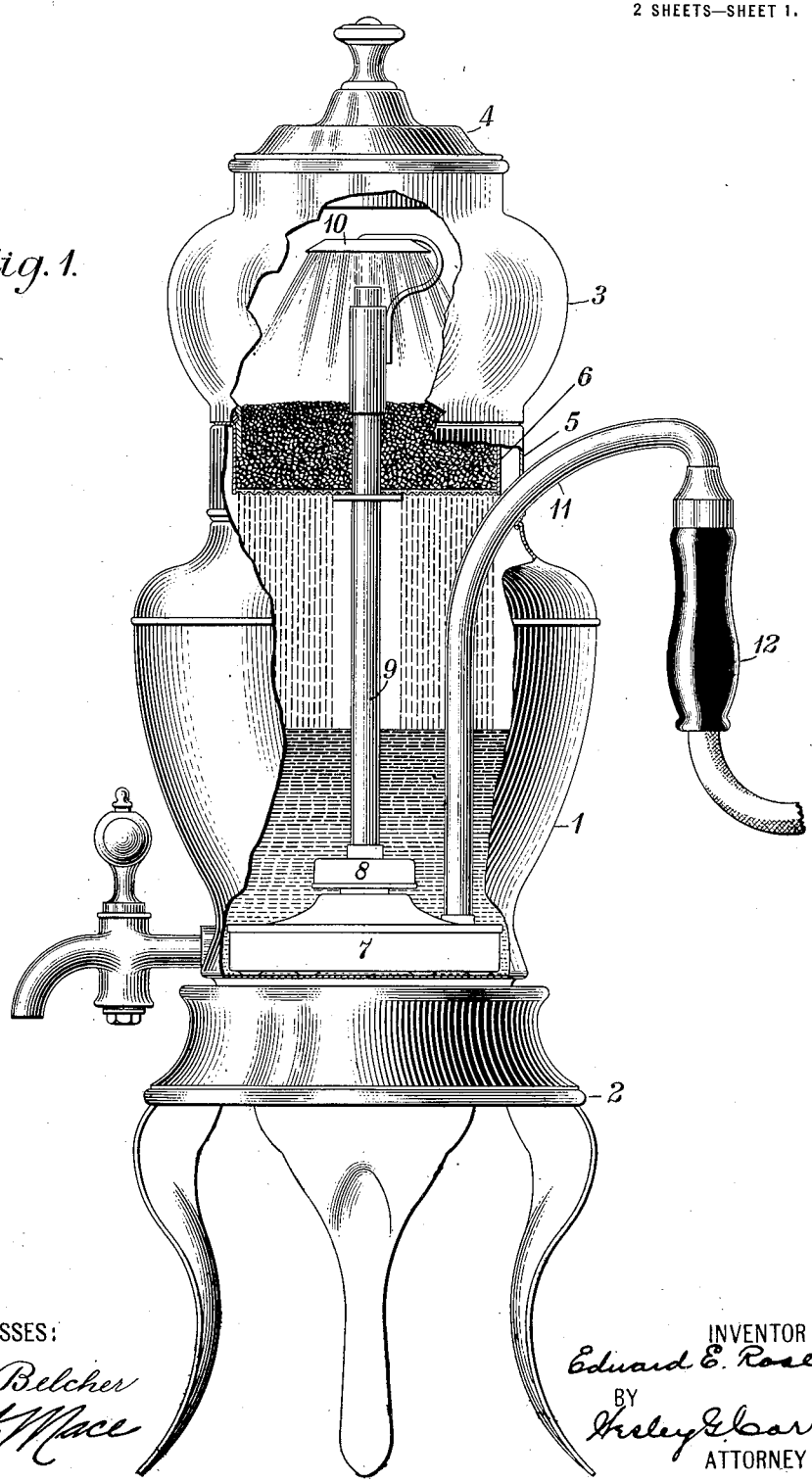
Figure 2:
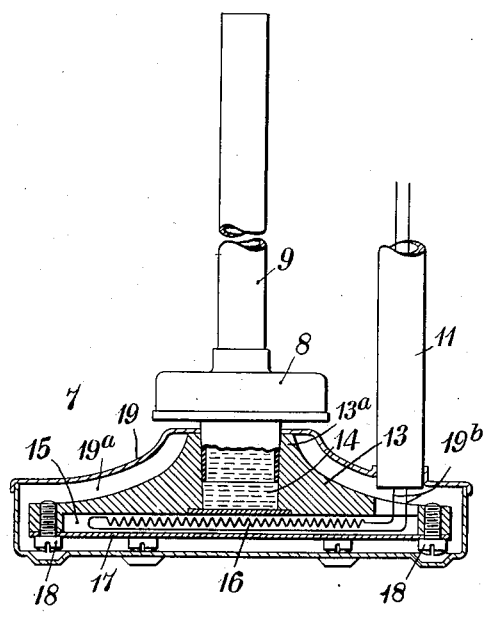
Figure 3:
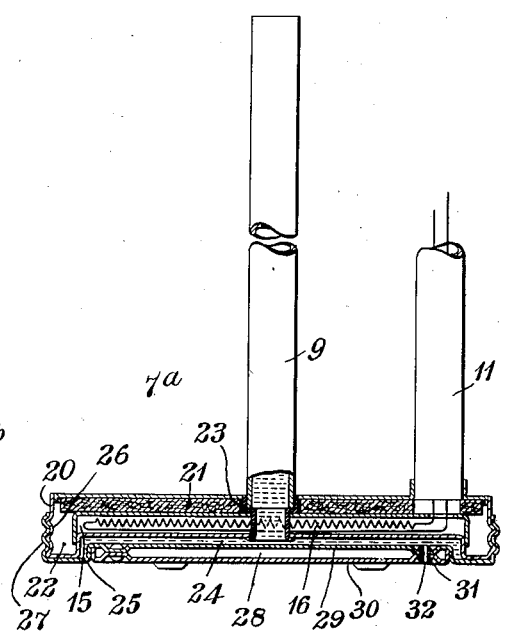
Figure 4:
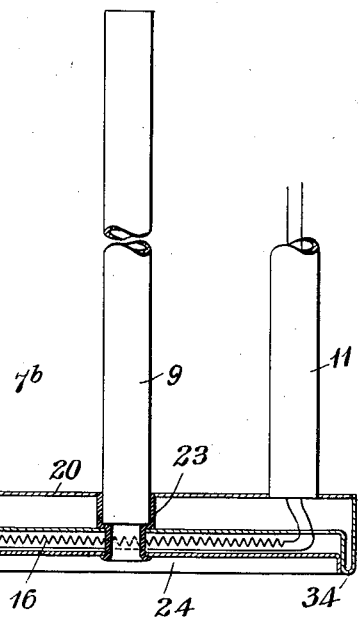

In the accompanying drawings, Figure 1 is a view, in elevation, of a device which embodies my invention. Fig. 2 is a view, partially in section and partially in elevation, of the heater unit shown in Fig. 1, the resistance element being shown diagrammatically. Fig. 3 is a view similar to Fig. 2 and shows a modified form of heater, and Fig. 4 is a similar view showing a still further modification.

Referring to the drawings in detail, the device herein shown comprises a liquid-containing vessel 1, a base or standard 2, an upper compartment 3, a cover 4, a removable spacing ring 5, a receiving receptacle 6, a heater unit 7, a valve or pump 8, a fountain tube 9 and a spreader 10.

With the exception of the removable spacing ring 5 and the removable heater unit 7, the device shown comprises a common type of exteriorly heated percolating machine, the construction and mode of operation of which are old and familiar in the art and will not be described.

In order to adapt the common type of percolating device for electric heating, it is merely necessary to associate the heater unit 7 with the valve 8 and fountain tube 9, and to interpose the removable spacing ring 5 between the containing vessel 1 and the upper compartment 3, whereby the heater unit leads are brought out through a tube 11 to a suitable terminal handle 12.

Reference may now be had to Fig. 2, which shows the preferable type of heater unit and which comprises a circular body member 13 of good heat-conducting material having a raised upper portion 13$^a$ which is provided with a centrally located well 14 and a recess 15 of small depth and relatively large diameter, for the purpose of receiving a suitable resistance element 16.

The resistance element 16 forms no part of my invention, except as it performs a necessary function in the device as a whole, and hence, will not be described in detail. Any one of the well-known types of resistance elements may be employed to accomplish the desired result.

A plate or disk 17 is disposed below the resistance element 16 and is securely fastened to the body member 13 by a plurality of screws 18, whereby the resistance element 16 is inclosed in the water-tight compartment 15.

A sheath or casing 19 is secured to the upper portion 13ᵃ of the body member 13 and entirely envelops the heater unit, whereby a heat-insulating air chamber 19ᵃ is provided on all sides of said unit which tends to confine the heat and prevent rapid radiation, as will be readily understood.

It will be observed that the valve 8 and fountain tube 9 are associated with the well 14 of the heater unit 7; also, that said heater unit is provided with a tube 11 which incloses the resistance leads 19ᵇ between the terminal handle 12 and the resistance element 16.

Through the agency of the valve or percolator pump 8, which may be of any of the ordinary types, a small body of water is admitted to the well 14, and, when electrical energy is applied to the resistance element 16, the greater portion of the heat generated therein is conducted through the body member 13 and is localized at the well 14. The water contained in the well is therefore rapidly heated and flashed into steam, thus forcing up some of the water contained within the fountain tube 9 and projecting it against the spreader 10, according to the usual practice.

While the greater portion of the heat generated in the resistance element 16 is utilized in heating the liquid within the well 14, the remainder thereof is slowly radiated through the enveloping air chamber 19ᵃ and is imparted to the main body of the liquid surrounding the heater unit. Thus, the entire electrical energy is utilized for the purpose intended and the results hereinbefore mentioned are accomplished.

Referring to Fig. 3, the heater unit 7ᵃ comprises an upper disk-like casing 20 which is partially filled with a body of heat-insulating material 21 and is so constructed as to embody a downwardly extending annular air chamber 22. Within the recess 15 provided by the annular air chamber 22, the resistance element 16 is disposed and, by suitable construction, is inclosed in a water-tight compartment.

A bushing 23 is centrally located in the upper casing 20 to receive the fountain tube 9 and to communicate with a thin water space 24 of relatively large diameter which is provided intermediate the upper casing 20 and a removable lower casing 25. In order that the lower casing 25 may be readily detached, screw threads 26 and 27 are provided in the upper and lower casings, respectively.

The lower casing 25 embodies an air chamber 28 formed between an upper member 29 and a lower member 30 which are tightly secured together by means of rivets 31 having small openings 32 therein for the purpose of communicating between the thin water space 24 and the main body of water surrounding the heater unit. It will be observed that, in this heater unit, a small portion of the liquid is segregated from the main body and is disposed in a thin film in intimate contact with the resistance element 16 and may, therefore, be raised to a high temperature rapidly. Furthermore, the air chambers 22 and 28 and the heat-insulating medium 21 prevent the rapid radiation of heat and tend to localize the same for the purpose of imparting it to the water contained within the water space 24.

It is evident that, when the temperature of the water contained within the water space 24 is raised sufficiently, a force is exerted on the water contained in the tube 9 and a portion of it is displaced in the usual manner. In this type of heater, no percolating pump or valve is necessary, inasmuch as the water enters the water space 24 through the openings 32 as fast as the percolating action of the device requires.

In Fig. 4, the heater 7ᵇ comprises an upper disk-like casing 20 provided with an air chamber 33 and an annular air chamber 22 which projects downwardly to form a recess 15, in which the resistance element 16 is disposed in a water-tight compartment. A bushing 23 to receive the fountain tube 9 and to communicate with a thin water space 24 of relatively large diameter is centrally located within the upper casing 20.

By so constructing the heating device, the greater portion of the heat generated in the resistance element 16 is imparted to the water contained within the space 24, and, on account of the large heating surface exposed and the thinness of the film of water contained within said water space, it is evident that said film of water is rapidly heated and flashed into steam. The water contained within the tube 9 is therefore forced upwardly, according to the usual manner of such devices. The remainder of the heat generated in the resistance element 16 is slowly radiated through the air chambers 22 and 33 and is imparted to the main body of the liquid, whereby its temperature is gradually raised. As fast as the water contained within the water space 24 is heated and displaced, the space is refilled from the main body of liquid which enters beneath the bottom edge 34 of the upper casing 20 and the process continues intermittently.

Those skilled in the art will readily understand that my invention is not restricted to the specific structural details and arrangement of parts herein shown and described, and it is evident that many modifications may be effected therein without departing from the spirit and scope of my invention.

I claim as my invention:

1. The combination with a liquid-containing vessel, a heater unit immersed therein, and a fountain tube, of means for dividing the liquid to produce a relatively thin film adjacent to the heating surface of the heater unit, and a heat-insulating barrier enveloping the remainder of the heater unit.

2. An electric heater adapted for immersion in a body of liquid and comprising a heating element, means for imparting a portion of the heat generated therein to the main body of liquid, means for inclosing a portion of said liquid within said heater, and means for localizing the remaining heat and imparting it to the said inclosed portion of said liquid.

3. In a percolator, the combination with a vessel, a body of liquid contained therein, and a fountain tube, of a heating device associated with said fountain tube and adapted for immersion in said body of liquid, said device comprising a source of heat, means for localizing a portion of said heat to raise the temperature of a portion of said body of liquid to a high degree, whereby said portion of liquid is forced through said tube, and means for imparting the remaining heat to the main body of liquid surrounding said heating device.

4. In a percolator, the combination with a vessel, a body of liquid contained therein, and a fountain tube, of a removable heating device associated with said fountain tube and adapted for immersion in the said body of liquid, said device comprising a source of heat, means for inclosing a portion of said liquid within said heating device, means for rapidly imparting the major part of said heat to said inclosed portion of said liquid, and means for imparting the remaining heat to the main body of liquid.

5. The combination with a vessel, a body of liquid contained therein, a fountain tube and a heating device immersed in said liquid and comprising a source of heat, and means for slowly imparting a portion of said heat to the main body of liquid surrounding said heating device, of means for localizing the remaining heat and rapidly imparting it to a small segregated portion of said liquid, whereby part of said liquid is projected through said fountain tube.

6. In a percolator, the combination with a vessel, a body of liquid contained therein, and an electric heater immersed in said liquid, said heater comprising a resistance element, means for producing a relatively thin film of liquid in proximity to a portion of said resistance element within the said heater, and a fountain tube communicating with said film of liquid, of means for preventing free radiation from the remaining portion of said resistance element.

7. The combination with a liquid-containing vessel, an electric heater immersed in said liquid and comprising a body member of relatively good heat conducting material having a well of relatively restricted area disposed therein, and a heating unit intimately associated with said body member, of a heat-insulating medium enveloping a portion of said body member and said heating unit.

8. An electric heater adapted for immersion in a body of liquid and comprising a body member of relatively good heat-conducting material, said body member having a centrally located well in its upper portion, a heating element intimately associated with the bottom of said body member, and an air chamber partially enveloping said body member and said resistance element for localizing the heat generated in said well.

9. An electric heater adapted for immersion in a body of liquid and comprising an upwardly tapered body member of good heat-conducting material, said member having a well centrally disposed therein, a heating element intimately associated with the bottom surface of said body member, and means for directing the conduction of heat generated in said heating element toward said well, whereby the liquid contained therein is flashed into steam.

10. In a percolator, the combination with a liquid reservoir, a body of liquid, a fountain tube, and a heating device adapted for immersion in said liquid, said device comprising a body member of good heat-conducting material, having a well disposed in its upper portion to receive said fountain tube, and a source of heat intimately associated with said body member, of means for slowly storing a portion of said heat in the main body of liquid surrounding the heating device and for localizing the remaining heat and imparting it rapidly to the liquid contained in said well, whereby said liquid is flashed into steam and a portion thereof is forced up through said fountain tube.

11. In a percolator, the combination with a liquid reservoir, a body of liquid contained therein, and a fountain tube, of an electric heater adapted for immersion in said liquid and comprising a hollow disk-shaped upper member filled with heat-insulating material and having a cylindrical recess of relatively large diameter and small depth therein, an inclosed resistance element disposed within said recess, and a removable lower member adapted to be secured to said upper member and comprising a bottom air chamber, openings therethrough to communicate with a thin liquid space of relatively large diameter intermediate said inclosed resistance and said air chamber, said fountain tube being adapted to communicate with said intermediate liquid space.

12. In a percolator, the combination with a liquid reservoir, a body of liquid, a fountain tube, and an immersed removable electric heater comprising a heating unit having a single active heating surface of large area, and heat-insulating barriers enveloping the rest of said heating unit, of removable means for producing a thin film of liquid adjacent to said heating surface and embodying a heat-insulating barrier adjacent to said film of liquid and openings through said last-named heat-insulating barrier to communicate with said film of liquid.

13. An electric heating device adapted for immersion in a body of liquid and comprising a resistance element, means within the said device for dividing said liquid to produce a thin film adjacent to said resistance element, means for enveloping said resistance element and said thin film of liquid with heat-insulating barriers, and a centrally located well in said heating device communicating with said film of liquid.

14. The combination with a liquid-containing vessel, a body of liquid and a fountain tube, of a removable electric heating device adapted to be immersed in said liquid and to rest upon the bottom of said vessel and comprising an inclosed heater unit disposed adjacent to a relatively thin film of liquid, means for localizing the heat generated in said heater unit and imparting it to said thin film of liquid, and a well in said heating device communicating with said film of liquid and adapted to receive one end of said fountain tube.

15. In a heating device, the combination with a utensil of a relatively long, electrically heating, closed element, and a food containing cup surrounding a portion thereof and supported in said utensil.

16. In a heating device, the combination of a relatively long, electrically heating element, a perforate food containing-cup provided with a central imperforate tube surrounding a portion of said heating element.

17. Improvements of the character described, comprising a water-heating chamber, a holder for coffee or the like, and an electrical heater in the water-heating chamber and provided with an extension passing through said holder for coffee or the like.

In testimony whereof, I have hereunto subscribed my name this 22nd day of Nov., 1910.

EDWARD E. ROSE.

Witnesses:
FRANK THORNTON, Jr.,
B. B. HINES.